United States Patent Office 3,431,751
Patented Mar. 11, 1969

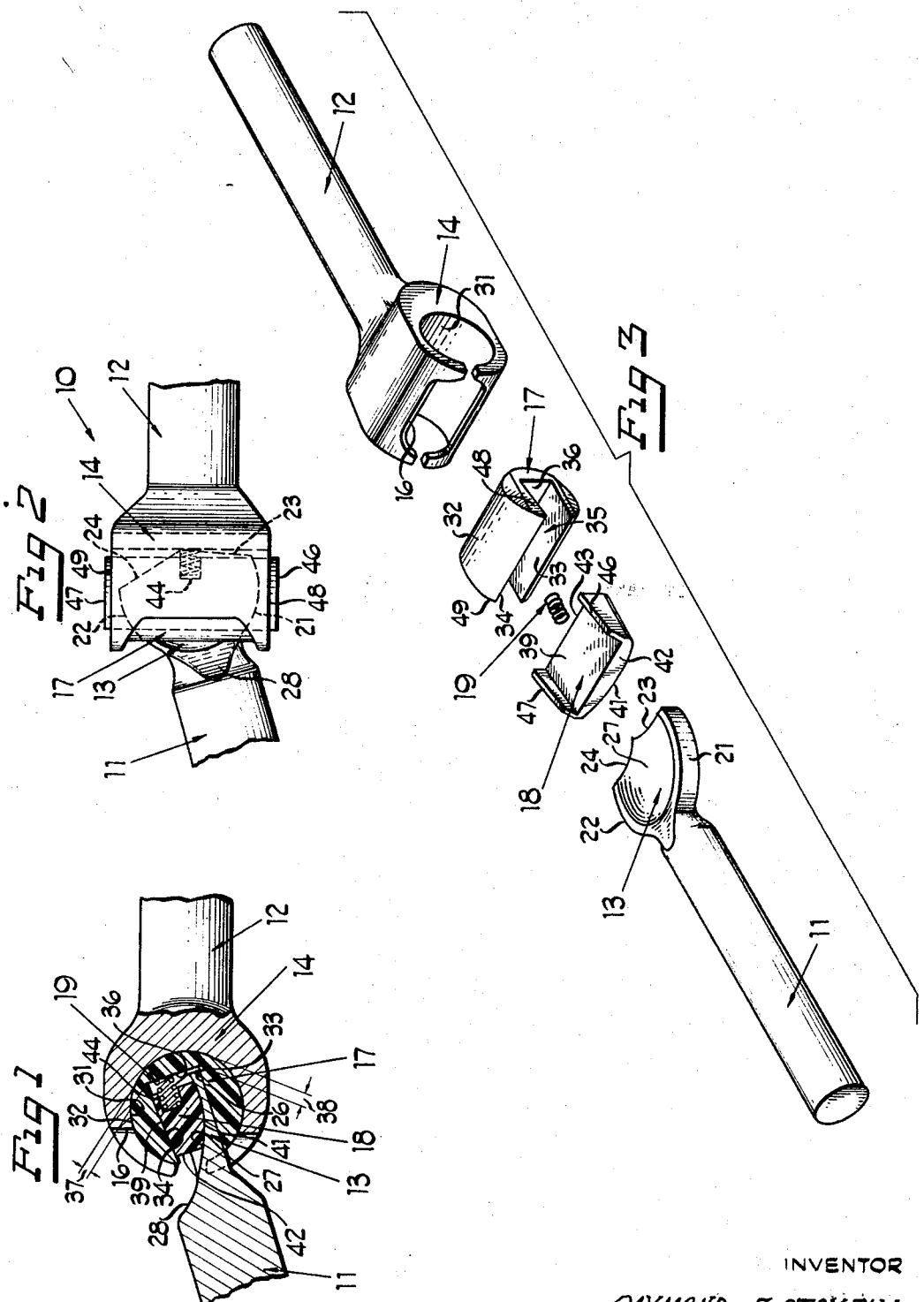

3,431,751
ANTI-BACKLASH UNIVERSAL JOINT
Raymond E. Stokely, Rockford, Ill., assignor to Borg-Warner Corporation, Chicago, Ill., a corporation of Illinois
Filed Sept. 14, 1967, Ser. No. 667,684
U.S. Cl. 64—7          5 Claims
Int. Cl. F16d *3/76;* F16c *11/06;* F16b *7/00*

ABSTRACT OF THE DISCLOSURE

An anti-backlash universal joint is provided with a spring biased wedge block which simultaneously urges a tang projecting from one rotary member into engagement with a channel in a bushing while expanding the bushing into engagement with a cylindrical socket in the other rotary member thus continuously compensating for wear of the rubbing surfaces.

Summary of the invention

The present invention relates generally to a universal joint comprised of a driving and driven member arranged with respect to each other so as to provide a generally articulated drive connection therebetween.

Among the problems involved in universal joint drive connections is the wear generated by oscillation of the component parts while the input and output shafts are undergoing rotation. The rubbing of these surfaces ordinarily required lubrication and adjustment to maintain satisfactory operation of the universal joint.

An object of the present invention is to provide an improved universal joint having self-lubricating components which are biased with respect to each other to continuously compensate for any wear which might occur between the rubbing surfaces. Another object of the invention to to provide a joint that may be operated for long periods of time without attention. A still further object of the present invention is to provide a novel universal joint apparatus in which a single resiliently biased member coacts with the other members of the apparatus to continuously compensate for wear between the several rubbing surfaces thereof.

Brief description of the drawings

FIGURE 1 is a side elevation view, partially in section, illustrating a universal joint according to the present invention;

FIGURE 2 is a top plan view of the universal joint shown in FIGURE 1;

FIGURE 3 is an exploded perspective view of the universal joint according to the present invention showing the various components thereof to better advantage.

Description of the preferred embodiment

Referring now in more detail to the drawing, a universal joint 10 is illustrated forming a driving connection between a pair of driving and driven members represented by the rotatable shafts 11 and 12. The driving shaft 11 includes a tang portion 13 projecting from one end thereof, while the driven shaft 12 includes a particylindrical socket 14 including an aperture 16 extending along the end thereof adapted to receive the tang 13. A bushing 17, wedge block 18 and spring 19 cooperate with tang 13 and socket 14 to form the principal components of the present universal joint assembly.

Referring now to shaft 11, tang 13 is formed on an end thereof having substantially circular side edge portions 21 and 22 as viewed in plan view, and a pair of substantially straight end edge portions 23 and 24. As viewed in side elevation, tang 13 is provided with a substantially planar lower surface 26 and a concave partispherical upper surface 27. A transition portion 28 of shaft 11 includes fairing surfaces flowing smoothly from the cylindrical portion of the shaft into the tang portion.

Referring now to shaft 12, socket portion 14 is formed on an end thereof having a substantially cylindrical bore 31 extending transversely thereof, and including the aperture 16 providing an opening for receiving tang 13. Aperture 16 is enlarged intermediate its ends providing clearance for tang 13 as the driving and driven members assume various angular attitudes with respect to each other.

Bushing 17 is of substantially cylindrical shape having a cylindrical outer surface 32 complementary to and receivable within the bore 31 of socket portion 14. A keystone shaped channel 35 is formed within said bushing defined by a pair of spaced converging faces 33 and 34, and a root surface 36. Faces 33 and 34 intersect outer surface 32 to provide an opening extending along the side of the bushing. The intersection of root surface 36 with faces 33 and 34 forms a pair of thin hinge-like wall portions 37 and 38 providing a measure of flexibility in the bushing wall. These flexible wall portions thus facilitate expansion of the bushing into snug engagement with the inner surface 31 of socket 14.

Inasmuch as bushing 17 undergoes oscillatory motion within the socket as the shafts rotate, it is desirable to reduce friction between the rubbing surfaces. It is preferable in the present apparatus to accomplish this purpose by forming the bushing and socket of dissimilar materials such as for example, forming the socket of metal and the bushing of a plastic substance. The bushing is preferably formed of a plastic material having self-lubricating properties in which a lubricating agent is dispersed within a matrix material, such as a polyamide filled with carbon black. Among the advantages to be gained by forming the bushing of a plastic substance is that the hinge portion of the bushing can be made thicker for ease in manufacturing while still retaining a high degree of flexibility for expanding the bushing into snug fitting engagement with the socket. Examples of other plastic substances suitable for the bushing are polyethylenes, substituted ethylene polymers, and polypropylene, as well as these plastics filled with carbon black.

Wedge block 18 forms an important part of the universal joint coupling according to the present invention and may also be formed of a self-lubricating material such as one of the plastic substances set forth for the bushing. Wedge block 18 has a planar surface 39 arranged to engage face 34 of the keystone channel in bushing 17. The opposite surface 41 of wedge block 18 is of convex contour preferably spherical and complementary to the concave surface 27 of tang 13. Wedge block 18 is provided with front and rear faces 42 and 43, respectively, which extend between the planar surface 39 and convex surface 41. Rear face 43 is provided with a pocket 44 for receiving spring 19. Each side of wedge block 18 is preferably provided with an upstanding cleat 46, 47 engageable with respective end surfaces 48, 49 of bushing 17. The cleat portions serve to locate the wedge block transversely in the bushing while the convex portion of the wedge block serves to locate the tang transversely with respect to the bushing.

Spring 19 is engaged with wedge block 18 and seated against root surface 36 of the keystone shaped channel 35. While a helical compression spring is shown for purposes of convenience, other kinds of resilient members may be used if desired, such as, for example, leaf springs, pleated springs or elastomeric compression blocks. Where other kinds of spring members are used, appropriate modifications may be desired in the root surface of the bushing channel or the rear face of the wedge block to form a suitable seat for the resilient member.

The universal joint of the present invention continuously takes up clearances between the wear surfaces thereof to provide an anti-backlash joint. The cooperation of the various components in providing continuous take up is best illustrated in FIGURE 1, where it is seen that the spring 19 urges wedge block 18 toward the converging end of the keystone shaped channel 35 in the expansible bushing 17. This action of the wedge block urges the planar surface of the tang into engagement with the planar surface of the bushing channel and simultaneously tends to expand the bushing into engagement with the inner surface of the socket. It is believed evident that three sets of surfaces are subjected to wear as the universal joint rotates, all of which are continuously biased into engagement by the one spring 19. Wear between the external surface of the bushing and the internal surface of the socket is taken up by expansion of the bushing. Wear between the convex and concave surfaces of the wedge block and tang and between the planar surfaces of the tang and bushing channel are taken up by the wedging action of the wedge block in the converging bushing channel. Thus a universal joint has been shown and described in which a single resilient means urges the several wearing surfaces continuously into engagement with each other to take up loose clearances resulting from rubbing of the surfaces during rotation of the assembly.

While a preferred form of the invention has been shown and described, it is to be understood that various modifications thereof are possible within the spirit of the invention and the scope of the following claims.

I claim:
1. A universal joint coupling (10) including a drive member and a driven member, one of said members including a projecting tang portion (13) and the other of said members including a transversely extending particylindrical socket portion (14) defining an opening (16) for receiving said tang, wherein an improved anti-backlash connection is provided between said tang and socket comprising: a first substantially planar surface (26) defining one face of said tang and a second substantially concave surface (27) defining an opposite face thereof; a wedge block (18) having a first substantially planar surface (39) spaced from a second substantially convex surface (41) complementary to and receivable within the concave surface of said tang; an expansible bushing member (17) having substantially cylindrical external surface (32) complementary to and receivable within said socket, and including a channel therein defining a pair of spaced faces (33, 34) converging towards each other providing an opening extending along a side thereof registerable with the opening in said socket, one of said faces (33) being engageable with the planar surface (26) of said tang and the other of said faces (34) being engageable with the planar surface (39) of said wedge block; and resilient biasing means (19) urging said wedge block along said other channel face (34) in the direction of convergence, wedging said tang into engagement with said one channel face while simultaneously expanding said bushing into engagement with said socket.

2. The combination of structure according to claim 1 in which the channel of said bushing member is further defined by a root surface (36) extending generally perpendicularly to one of said channel faces, said root surface providing a seat for said resilient biasing means.

3. The combination of structure according to claim 1 in which said bushing member is of unitary construction having a relatively thin wall portion (37 or 38) adjacent one of said channel faces (34 or 33) providing a flexible hinge permitting expansion of said bushing member responsive to movement of said resiliently biased wedge block along said other channel face.

4. The combination of structure according to claim 1 in which said bushing member is formed of a plastic material having self-lubricating properties.

5. The combination of structure according to claim 1 in which said wedge block is formed of a plastic material having self-lubricating properties.

References Cited
UNITED STATES PATENTS

| | | | |
|---|---|---|---|
| 1,359,354 | 11/1920 | Geer | 64—7 |
| 2,401,814 | 6/1946 | Burhans | 287—88 |
| 2,841,428 | 7/1958 | Moskovitz | 287—90 |
| 3,164,974 | 1/1965 | Urbats | 64—7 |
| 3,229,481 | 1/1966 | Dunn | 64—7 |

HALL C. COE, *Primary Examiner.*

U.S. Cl. X.R.

287—88